H. KIENZLE.
REMOVABLE SPRING HOUSING FOR CLOCKS.
APPLICATION FILED APR. 2, 1914.
1,110,061.
Patented Sept. 8, 1914.
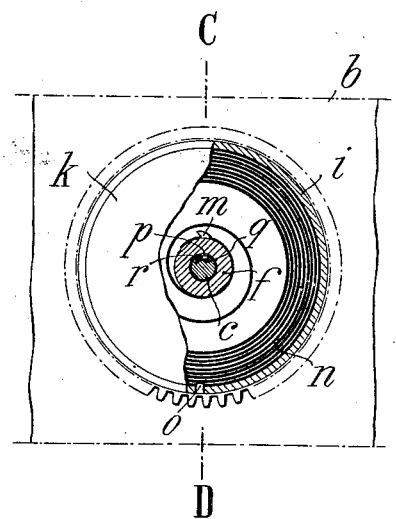
Fig. 1.
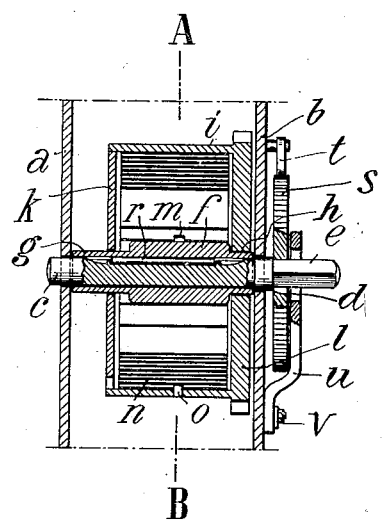
Fig. 2.
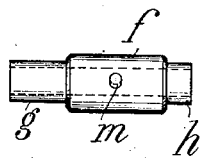
Fig. 3.
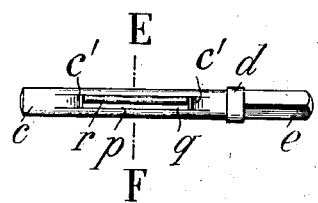
Fig. 4.
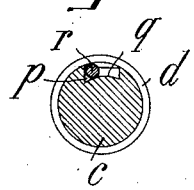
Fig. 5.
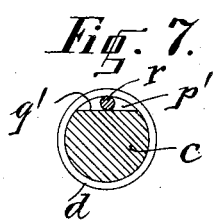
Fig. 7.
Witnesses:
Inventor
Herbert Kienzle
by John Lotka
Attorney.

UNITED STATES PATENT OFFICE.

HERBERT KIENZLE, OF SCHWENNINGEN-ON-THE-NECKAR, GERMANY.

REMOVABLE SPRING-HOUSING FOR CLOCKS.

1,110,061.  Specification of Letters Patent.  Patented Sept. 8, 1914.

Application filed April 2, 1914. Serial No. 828,951.

*To all whom it may concern:*

Be it known that I, HERBERT KIENZLE, a citizen of the German Empire, and resident of Schwenningen-on-the-Neckar, Germany, have invented certain new and useful Improvements in Removable Spring-Housings for Clocks, of which the following is a specification.

My present invention relates to a construction to be used in clocks for enabling the spring housing to be removed separately from the frame of the clock, that is to say, without disturbing the bridge or plates of the clockwork. This of course is an advantage when it is desired to make repairs, say on account of a broken spring. In such devices as made heretofore, the spring housing has been provided with an axial sleeve having a clutch connection with the winding spindle, the said clutch connection, as constructed prior to my invention, comprising a narrow lug punched and bent inwardly from the said sleeve and fitted into a bayonet-slot of the spindle. This clutch is objectionable on account of the liability of the lug to break off readily. Now according to my invention, instead of coupling the spindle and sleeve by a lug rigid with the sleeve, I interpose a special clutch member between the sleeve and the spring, the parts being so constructed that upon the turning of the spindle (for winding the clock) said clutch member will by a wedging action couple the sleeve with the spindle. When desired, however, the sleeve and the housing with the spring contained therein, may be released by pulling the spindle out lengthwise, as is described in detail hereinafter.

Reference is to be had to the accompanying drawings, in which—

Figure 1 is a partial front view of the spring housing and adjacent parts, the right-hand portion being in section on the line A—B of Fig. 2; Fig. 2 is a cross section taken on the line C—D of Fig. 1; Fig. 3 is a face view of the sleeve attached to the spring housing; Fig. 4 is a face view of the winding spindle together with the clutch member formed as a roller; Fig. 5 is a cross section on the line E—F of Fig. 4; Fig. 6 shows the clutch roller separately; and Fig. 7 is a view similar to Fig. 5, but showing a slightly different construction of the clutch mechanism.

The plates $a$, $b$ of the clock frame are formed with holes or bearings for the winding spindle $c$, provided with a collar $d$ and with an angular portion $e$, the latter to receive a key in the well-known manner. On the spindle $c$ is mounted, between the plates $a$, $b$, and with a slight longitudinal play, a sleeve $f$, adapted to turn on said spindle. The ends $g$, $h$ of said sleeve are reduced in external diameter so as to form shoulders. The collar $d$ of the spindle $c$ engages the end portion $h$ of the sleeve $f$. The spring housing or barrel $i$ has two end plates or heads $k$, $l$ engaging, at their inner edges, the reduced portions $g$ and $h$ respectively of the sleeve $f$. The spring housing or barrel is mounted to turn on the sleeve and embraces the thick central portion of the sleeve.

A hook-like pin $m$ secured to the sleeve $f$ and extending outwardly therefrom, serves to connect with the inner end of the spring $n$, the latter having an opening or eye for this purpose, as indicated in Figs. 1 and 2. The outer end of the spring $n$ is attached to a pin $o$ carried by the housing or barrel $i$. The angular end $e$ of the spindle receives not only the winding key but also the customary ratchet wheels (Fig. 2) which in conjunction with the pawl $t$ prevents return movement of the spindle, said wheel being secured to the spindle. Axial movement of the spindle $c$ may be prevented, if desired, by means of an arm $u$ fastened by a screw $v$ to the plate $b$ and extending adjacent to the ratchet wheel, so that the latter will be confined between such arm and the plate $b$.

The spindle $c$ is provided with a longitudinal groove $p$ the inner surface or bottom $q$ of which is shaped as a cam, that is to say, such surface is not concentric with the spindle. In this groove is located a clutch pin or clutch roller $r$, this being the form of clutch member which I prefer to employ. The diameter of the clutch pin is such that when at the deepest portion of the groove (as shown in Fig. 5), it will just touch the inner surface of the sleeve $f$, so that in this position the clutch will be inactive or released.

If the spindle $c$ is turned contra-clockwise in Fig. 5, as it is during the winding operation, the clutch pin $p$, being forced outwardly by the action of the cam $q$, will become wedged between the spindle and the sleeve $f$, thus causing the latter to turn with the spindle and therefore winding the spring $n$. If however, at a time when the spring $n$ is fully relaxed, the spindle $c$ is turned clockwise in Fig. 5, the clutch pin $p$ will remain in its inactive position at the deepest point of the cam groove $p$, so that the spindle $c$ will turn without taking the sleeve $f$ along.

When it is desired to remove the spring housing $i$, the spring $n$ is relaxed fully and the ratchet wheel is removed from the angular spindle portion $e$. The spindle $c$ is then, by means of the winding key, turned in the direction opposite to the winding movement (clockwise in Fig. 5), so as to release the clutch connection of the sleeve $f$ with the spindle $c$, whereupon the latter may be withdrawn axially from the sleeve $f$. The spring housing $i$ may then be removed from the frame of the clock by slipping such housing out sidewise between the plates $a$, $b$. During this removal of the spring housing, the sleeve $f$ cannot be forced out of its proper central position relatively to the spring housing $i$, by the action of the spring $n$, since the reduced ends $g$, $h$, of the sleeve extend through the end plates or heads $k$, $l$, of the spring housing.

When the spring housing is to be inserted again, the manipulation is reversed, that is to say, the spring housing is first slipped into the proper position between the plates $a$, $b$, and then the spindle $c$, with the clutch member $r$ at the deepest part of the cam groove $p$, is inserted axially into the sleeve, whereupon the ratchet wheel is again slipped on the angular spindle end $e$ and the arm holding the ratchet against lengthwise movement is again screwed to the plate $b$.

While the groove $p$ might be extended the full length of the spindle portion to the left of the collar $d$, I prefer to have the groove only on part of said spindle portion, so that the spindle is formed with stops $c'$ which will prevent the clutch member $r$ from sliding lengthwise of the spindle; in this manner I guard against a separation of the clutch member from the spindle at the time of withdrawing the spindle, and against possible loss of the clutch member, which might drop into the works of the clock.

The construction shown in Fig. 7 is very similar to the one described above, but the bottom surface $q'$ of the cam groove or recess $p'$ is a plane surface instead of a curved surface, and the deepest point of said groove or recess is at its center. The released position of the clutch member $r$ in this case is at the central portion of the recess $p'$, as shown, and upon turning the spindle $c$ in one direction or the other, the spindle will become coupled with the sleeve. Therefore, in this construction, when it is desired to remove the spring housing, (the spring being first relaxed as before), the spindle $c$ will be held or wiggled into, a central position, that is to say, a position where the clutch member $r'$ is at the center of the recess $p'$ as shown, and while in such position, the spindle will be pulled out lengthwise as before.

While I have referred to a roller as the preferred form of clutch member, I may employ other forms of clutch members, whether rolling or not.

The clutch mechanism described herein is very simple and efficient as well as certain in operation. It also offers the particular advantage that when the spindle $c$ is turned in the direction opposite to the winding movement, for the purpose of removing the spring and its housing (the spring being relaxed at the time), the sleeve $f$ is unclutched or released from the spindle $c$, thereby preventing any accidental unhooking of the inner end of the spring $n$ from the hook $m$.

As stated above, I may employ other clutch members (for instance balls) instead of rollers or pins. Of course, the spindle $c$ may be provided with two or more grooves or recesses each containing one or more clutch members having the function described. Instead of the curved or plane surface shown, the recess may have a cam surface of different formation. These modifications and others may be made without departing from the nature of my invention as set forth in the appended claims.

I claim as my invention:

1. An axially removable winding spindle for clocks, provided with a recess and with stops at each side of said recess, a separate clutch member located in said recess and adapted to engage said stops so as to compel said clutch member to move lengthwise in unison with the spindle as the latter is shifted inwardly or outwardly, and a sleeve surrounding said spindle and adapted to be connected therewith by said clutch member.

2. In clutch mechanism, a spindle provided with a recess whose inner wall is plane and extends continuously across the spindle to form a double-acting cam, a sleeve mounted on said spindle loosely, and a separate clutch member interposed between the spindle and the sleeve at said recess and having unobstructed travel on the said plane wall transversely from one end of said recess to the other.

In testimony whereof, I have signed this specification in the presence of two subscribing witnesses.

HERBERT KIENZLE.

Witnesses:
J. B. GODVIN,
WM. F. MANN.